United States Patent
Couch

[19]

[11] Patent Number: 6,140,619
[45] Date of Patent: Oct. 31, 2000

[54] TEMPERATURE CONTROL APPARATUS, METHOD AND MEMORY MEDIUM FOR AN OVEN

[75] Inventor: Jeffrey Neil Couch, Mountain Top, Pa.

[73] Assignee: The Garland Group, Freeland, Pa.

[21] Appl. No.: 09/322,044

[22] Filed: May 28, 1999

[51] Int. Cl.⁷ .................................................. H05B 1/02
[52] U.S. Cl. ........................ 219/492; 219/413; 219/497; 219/506
[58] Field of Search ..................... 219/483–486, 219/492, 494, 497, 501, 505, 508, 506, 412, 413, 414; 307/117

[56] References Cited

U.S. PATENT DOCUMENTS

| | | |
|---|---|---|
| 3,779,228 | 12/1973 | Mizuno et al. . |
| 4,281,636 | 8/1981 | Vegh et al. . |
| 4,286,246 | 8/1981 | Jacques, Jr. et al. . |
| 4,374,320 | 2/1983 | Barnett . |
| 4,539,469 | 9/1985 | Gigandet ................................ 219/412 |
| 4,568,810 | 2/1986 | Carmean . |
| 4,692,598 | 9/1987 | Yoshida et al. . |
| 4,958,062 | 9/1990 | Han . |
| 5,015,827 | 5/1991 | Kadwell et al. . |
| 5,097,112 | 3/1992 | Kanaya et al. . |
| 5,111,028 | 5/1992 | Lee ........................................ 219/506 |
| 5,171,974 | 12/1992 | Koether et al. . |
| 5,183,984 | 2/1993 | Nakagawa . |
| 5,318,361 | 6/1994 | Chase et al. . |
| 5,332,886 | 7/1994 | Schilling et al. . |
| 5,378,874 | 1/1995 | Holling et al. . |
| 5,422,458 | 6/1995 | Simmel . |
| 5,432,321 | 7/1995 | Gerl . |
| 5,451,745 | 9/1995 | Goldberg et al. . |
| 5,477,036 | 12/1995 | Jun et al. . |
| 5,517,980 | 5/1996 | Cappello et al. . |
| 5,571,433 | 11/1996 | Baker . |
| 5,611,327 | 3/1997 | Filho et al. . |
| 5,618,460 | 4/1997 | Fowler et al. . |
| 5,680,810 | 10/1997 | Sham . |
| 5,710,409 | 1/1998 | Schwarzbäcker et al. . |
| 5,799,822 | 9/1998 | Rudewicz et al. . |
| 5,812,411 | 9/1998 | Calabrese et al. . |
| 5,841,112 | 11/1998 | Brooks et al. . |
| 5,880,436 | 3/1999 | Keogh . |

*Primary Examiner*—Mark Paschall
*Attorney, Agent, or Firm*—Ohlandt, Greeley, Ruggiero & Perle, L.L.P.

[57] ABSTRACT

A temperature control method and controller for an oven having a heater, a temperature sensor, a fan, a door, a cooking compartment and on oven on/off switch. The method includes a heat up procedure that involves running two or more heat up cycles to stabilize the cooking compartment to a cook temperature. The method also includes a time out procedure that reduces the cooking compartment temperature to a standby temperature in the event a time out period expires between the end of one cooking procedure and the start of the next cooking procedure. The method also includes an automatic cooling procedure that automatically cools the cooking compartment to a safe temperature whenever the oven on/off switch is switched from on to off.

23 Claims, 4 Drawing Sheets

TEMPERATURE CONTROL APPARATUS, METHOD AND MEMORY MEDIUM FOR AN OVEN

BACKGROUND OF INVENTION

1. Field of Invention

This invention relates to cooking ovens and, more particularly, to control of the oven temperature.

2. Description of Prior Art

Cooking ovens, for example baking ovens, convection ovens and the like are widely used in restaurants for cooking a variety of food products. Many fast food restaurant menu items require rapid cooking with precise control of cooking temperature, cooking time and other parameters.

It is known to shorten the time to bring an oven from a cool temperature to a cooking temperature by increasing the amount of heat applied during a preheat phase. Thus, U.S. Pat. No. 5,432,321 to Gerl discloses the use of both a normal heating device and a partial heating device during a preheat phase to shorten the heat up time.

It is also known to cool an oven after a cook cycle ends by operation of a fan in order to prevent damage to the oven or injury to the user. Thus, U.S. Pat. No. 5,880,436 to Keogh discloses a convection oven in which a fan that is powered on before an oven door is opened. The fan continues to operate after the door is opened to an ajar distance. The fan is automatically turned off when the oven door is substantially opened.

It is also known to automatically cool a toy oven when a cook cycle ends. Thus, U.S. Pat. No. 5,451,745 to Goldberg et al. discloses the use of a fan that is turned on to cool a toy oven when power to a heater times out for a cooking cycle. An interlock maintains the oven door locked while the fan is on, thereby preventing access and possible injury to a child. A timer or a temperature responsive device eventually turn the fan off and frees the interlock.

Conventional ovens lack a temperature control that accounts for stabilizing the oven temperature before starting a cooking procedure and/or that employs a standby temperature and/or an automatic cool down procedure.

SUMMARY OF INVENTION

The present invention meets these needs with a method that controls the temperature of the oven's cooking compartment with a heat up procedure, a time out procedure and/or an automatic cool down procedure. The heat up procedure involves running two or more heat up cycles to stabilize the cooking compartment temperature to a desired cook temperature before a cooking procedure begins. The time out procedure reduces the cooking compartment temperature to a standby temperature in the event a time out period expires between the end of one cooking procedure and the start of the next cooking procedure. The automatic cool down procedure cools the cooking compartment to a safe temperature whenever the oven is turned off. When performing the heating and cooling operations, the method controls a heater and/or a fan to increase or decrease the temperature of the cooking compartment.

A temperature controller according to the present invention controls the temperature of a cooking compartment of the oven. The oven has a temperature sensor located in the cooking compartment and a fan arranged to circulate air in the cooking compartment. The oven also has a heater and an oven on/off switch. The temperature controller includes a computer that operates the heater for two or more heat up cycles with each heat up cycle continuing until the temperature in the cooking compartment is about equal to the desired cook temperature. The computer then operates the heater and/or the fan to conduct a cooking procedure.

For embodiments that include the time out procedure, the computer determines when the elapsed time after one cook cycle ends without another cook cycle starting equals a time out period. When this occurs, the computer then operates the heater and/or fan to cool the temperature of the cooking compartment to a standby temperature.

For embodiments that include the automatic cooling procedure, the computer operates the fan to cool the cooking compartment when the oven switch has been turned from on to off.

The memory medium of the present invention has stored on it the temperature control program that controls the computer to operate to perform the heat up procedure, the time out procedure and/or the automatic cool down procedure.

BRIEF DESCRIPTION OF DRAWINGS

Other and further objects, advantages and features of the present invention will be understood by reference to the following specification in conjunction with the accompanying drawings, in which like reference characters denote like elements of structure and.

DESCRIPTION OF PREFERRED EMBODIMENT

Figure 1:
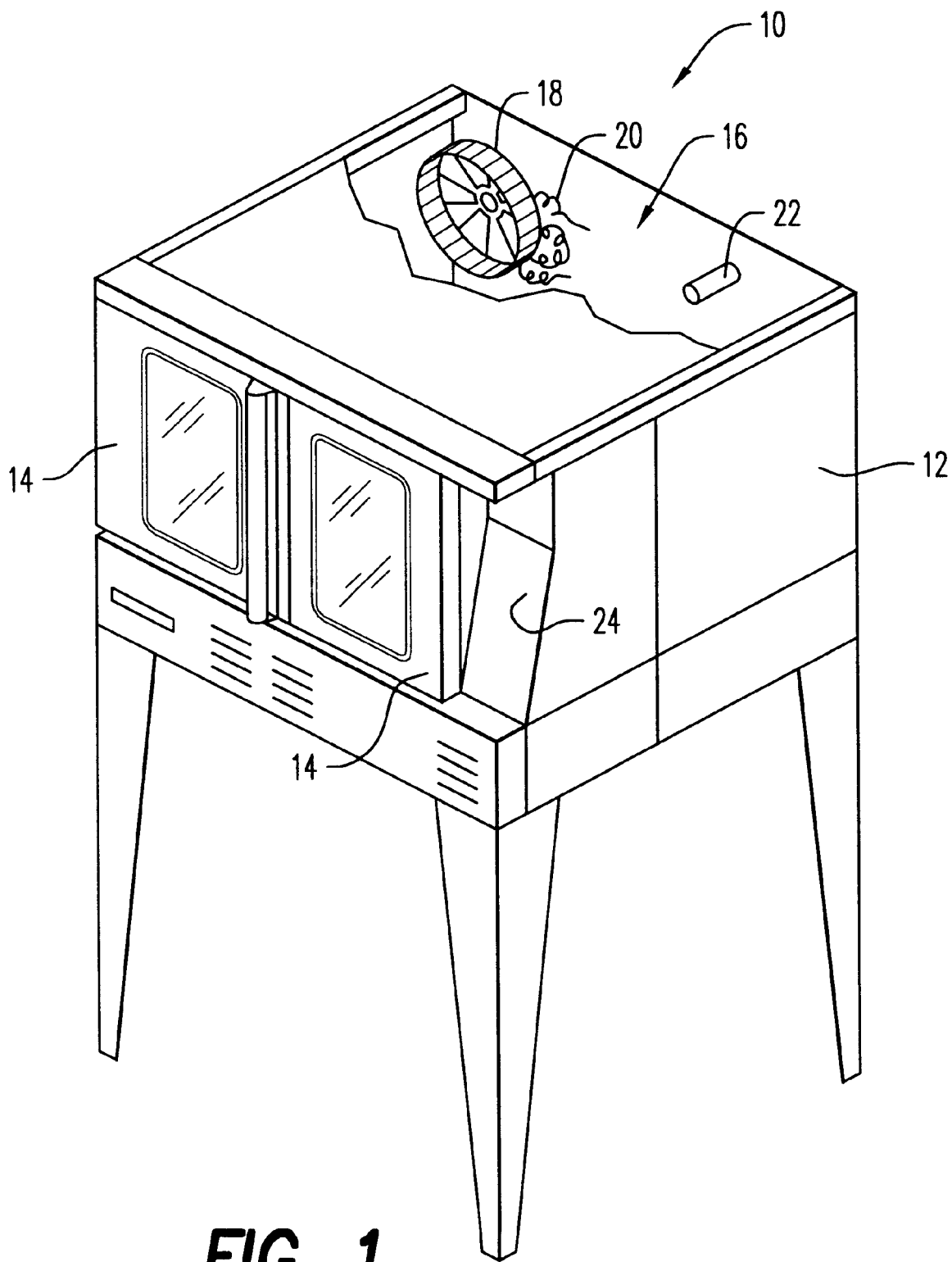
FIG. 1 is a perspective view of an oven that employs the method of controlling oven temperature in accordance with the present invention.

With reference to FIG. 1, there is provided an oven generally represented by numeral 10. Oven 10 may be any oven that can be used to cook food products. For example, oven 10 may be a baking oven, convection oven and the like. Oven 10 may be heated by either electricity or by gas. For the purpose of this description, oven 10 will be described as using an electrical heater.

Oven 10 includes a housing 12, doors 14, cooking compartment 16, a fan 18, a heater 20, a temperature sensor 22 and a control panel 24. A motor (not shown) drives fan 18. Temperature sensor 22 protrudes within cooking compartment 16 to sense the temperature within cooking compartment 16. Heater 20 is shown as an electrical heater coil to which electrical power is applied in a manner to heat cooking compartment 16 to a desired cooking temperature.

Figure 2:
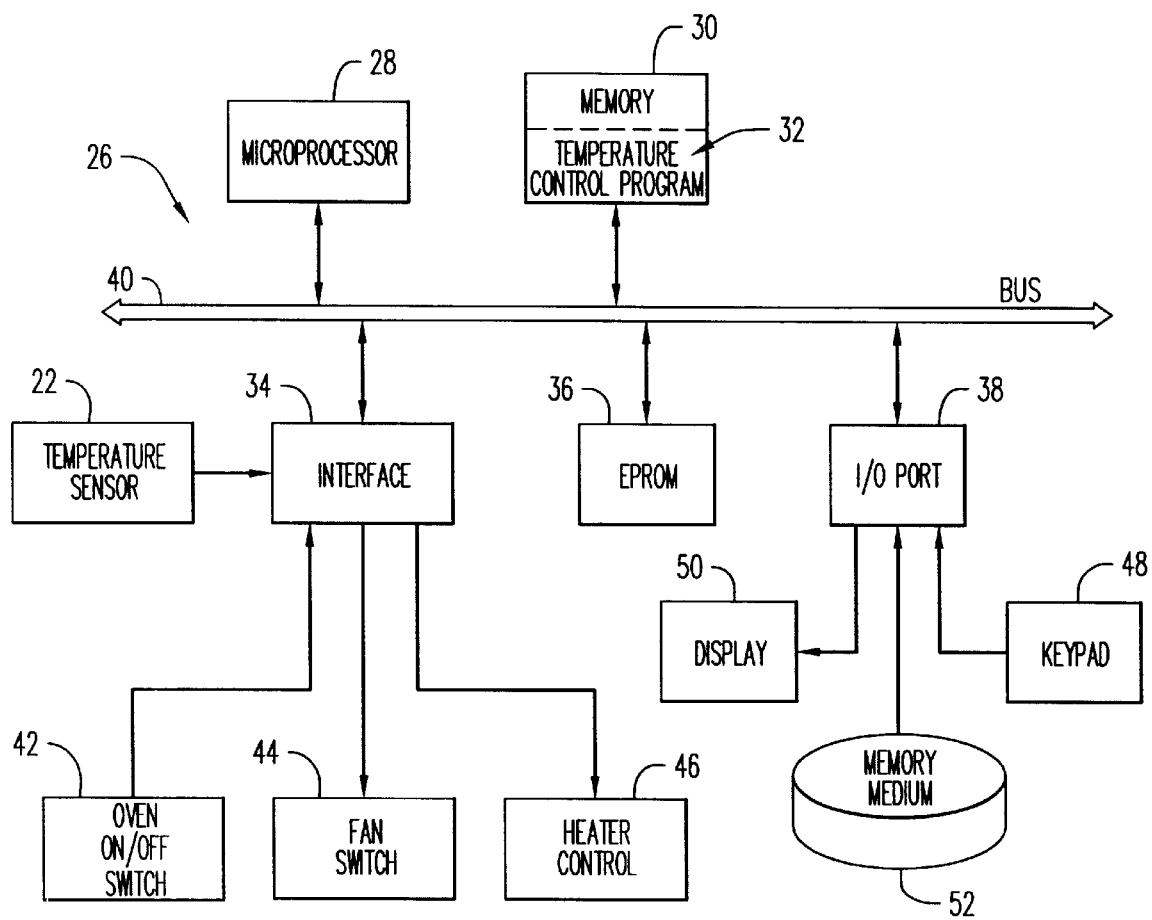
FIG. 2 is a block diagram of an temperature controller for controlling the temperature of the FIG. 1 oven.

Referring to FIGS. 1 and 2, a temperature controller 26 according to the present invention is contained within housing 12, but is not specifically shown in FIG. 1. Temperature controller 26 controls the temperature of cooking compartment 26 by comparing the temperature sensed by temperature sensor 22 with predetermined temperature values required for cooking operations and cooling operations. Temperature controller 26 issues control signals to operate heater coil 20 and fan 18 to vary the temperature from a current temperature to a desired temperature in accordance with the temperature control method of the present invention.

Temperature controller 26 includes a microprocessor 28, a memory 30, an interface 34, an EPROM 36 and an input/output (I/O) port 38, all of which are interconnected by a computer bus 40 to operate as a computer system under the control of microprocessor 28. Generally, microprocessor 28 operates under the control of programs stored in memory 30 to process data that is stored either in memory 30 or EPROM 36. EPROM 36 may contain, for example, frequently used display messages, cooking parameters, default parameters and the like.

Interface 34 is operable to receive and/or transmit signals to temperature sensor 22, an oven ON/OFF switch 42, a fan switch 44 and a heater control 46. I/O port 38 provides an I/O connection for I/O devices that include a keypad 48 and a display 50 that may each be located on control panel 24 of FIG. 1. Keypad 48 and display 50 are operable in the conventional manner to provide input data, commands and the like and output display of information.

A temperature control program 32 is stored in memory 30. Temperature control program 32 controls the temperature of cooking compartment 16 in accordance with the method of the present invention. Temperature control program 32 may be installed in memory 30 from a memory medium 52 via I/O port 38. Memory medium 52 may be a magnetic medium, such as a disk or tape, or other memory medium from which temperature control program 32 may be loaded into memory 30.

Interface 34 includes circuits (not shown) to convert analog signals from temperature sensor 22 and/or oven ON/OFF switch 42 to digital form usable by microprocessor 28. Interface 34 may also include other circuits (not shown) that convert control signals issued by microprocessor 28 to a usable format to fan switch 44 and to heater control 46.

Heater control 46 may simply be a switch that connects and disconnects heater coil 20 to a source of electric voltage or current upon command from microprocessor 28. Alternatively, heater control may be a resistor network that is configurable into a specific resistive value by switches controlled by a temperature value supplied by microprocessor 28 to regulate current supplied to heater coil 20. For the purpose of this description, heater control 46 is assumed to be simply a switch.

Figure 3:
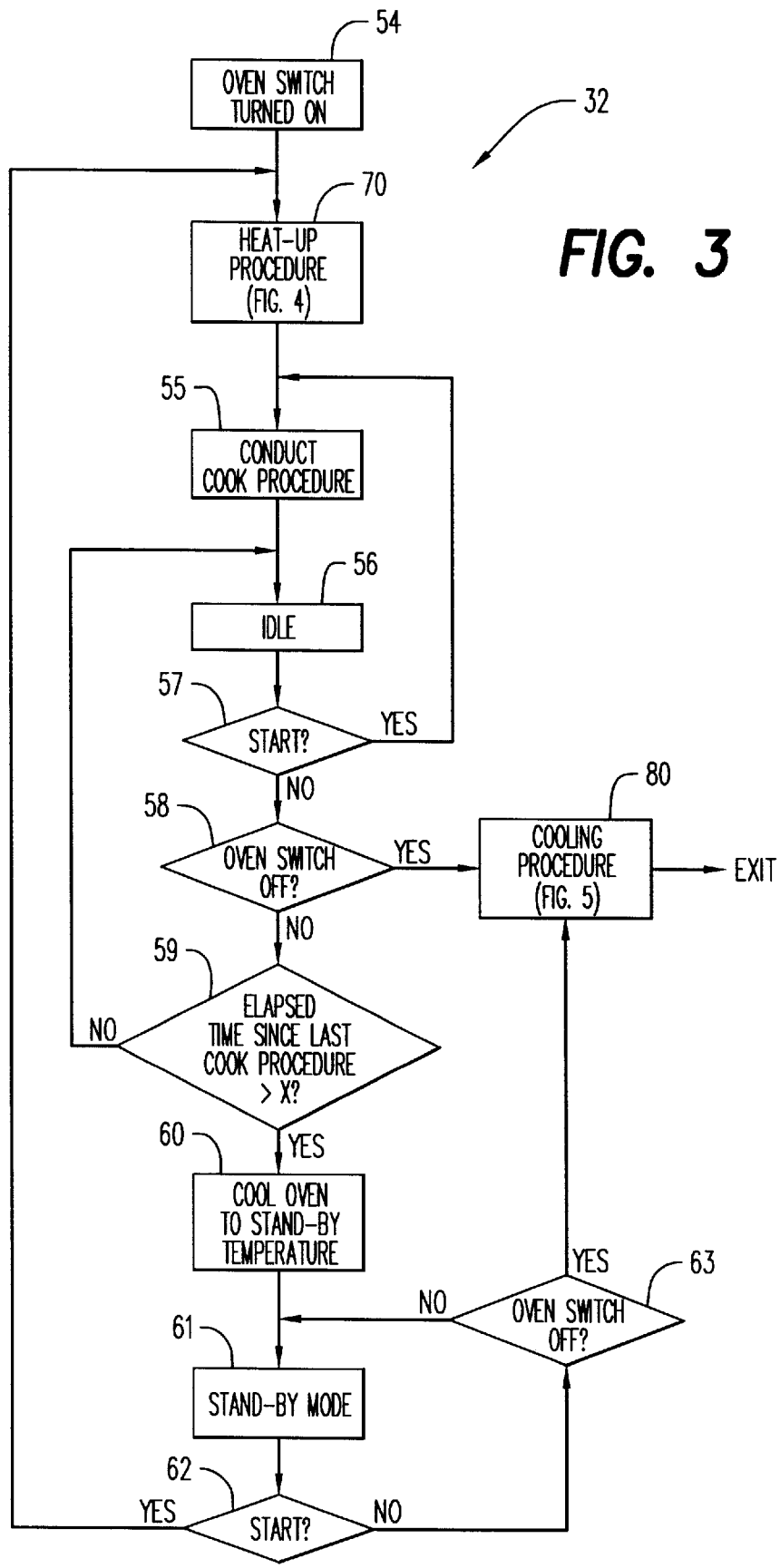
FIG. 3 is a process flow diagram of a temperature control method for the FIG. 1 oven.

Referring to FIG. 3, temperature control program 32 begins at a step 54 when oven ON/OFF switch 42 is sensed as on. In a next step 70, heater 20 is controlled by a heat up procedure to bring the temperature up to a desired cook temperature. When the temperature of cooking compartment 16 has stabilized at the desired cook temperature, a cook procedure is conducted by a step 55. After the cook procedure has ended, microprocessor 28 causes the system to idle by a next step 56.

At a step 57, microprocessor 57 is caused to determine if a new cook procedure is to be started. For instance, user operation of one or more keys of keypad 48 or of a separate start button (not shown on the drawings) signals the start of a new cook procedure. If a new cook procedure is to be conducted, step 55 is performed again. If a new cook procedure is not to be conducted at this time, a next step 58 determines if oven ON/OFF switch 42 has been turned off. If so, temperature control program 32 goes to a cooling procedure 80. After cooling procedure 80 is finished, temperature control program 32 is exited.

If step 58 determines that oven ON/OFF switch 42 is on, a next step 59 initiates a time out procedure that uses steps 56 through 59 in a loop to determine if the elapsed time since the end of the last cook procedure exceeds a predetermined time out value, designated at step 59 as X. If the elapsed time is not greater than X, steps 56 through 59 are performed again and again until the elapsed time exceeds the time out value X. When this happens, a next step 60 operates heater 20 and/or fan 18 to cool cooking compartment 16 to a standby temperature. The standby temperature is low enough to save energy, but high enough for step 70 to rapidly bring the temperature up to a cook temperature for a new cook procedure. For example, for a range of cook temperatures from about 350° F. to 400° F., the standby temperature may suitably in the range of about 250° F. to 300° F.. The time out period X may suitably be about 30 minutes, or such other period selected by the designer or user of oven 10.

When step 60 has cooled cooking compartment 16 to the standby temperature, a next step 61 maintains system in a standby mode by controlling heater 20 to maintain the standby temperature. At a step 62, microprocessor 28 is caused to determine if a new cook procedure is to be started. Step 62 is substantially identical to step 57. If a new cook procedure is to be conducted, step 55 is performed again. If a new cook procedure is not to be conducted at this time, a next step 58 determines if oven ON/OFF switch 42 has been turned off. If so, temperature control program 32 goes to cooling procedure 80. After cooling procedure is finished, temperature control program 32 is exited.

Figure 4:
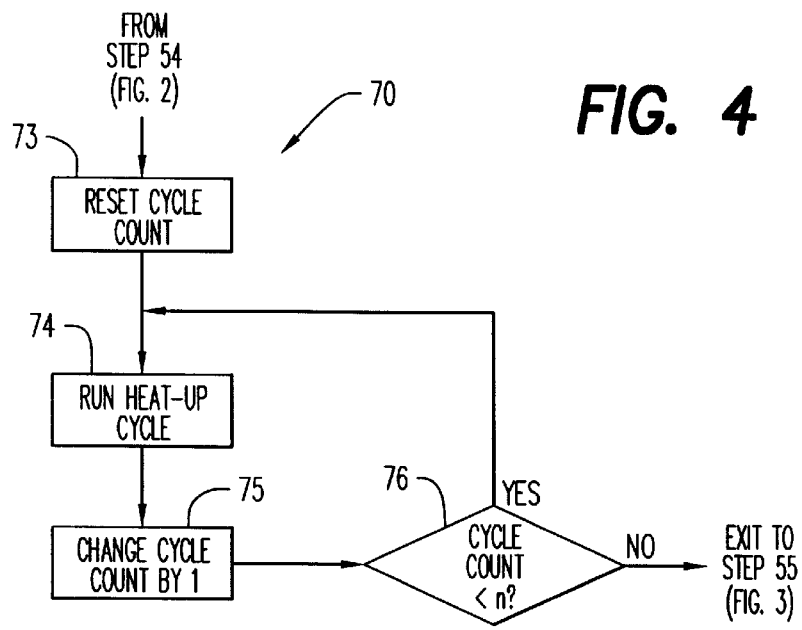
FIG. 4 is a process flow diagram of a temperature control method for controlling the heat up of the FIG. 1 oven.

Referring to FIG. 4, heat up procedure 70 involves performing at least two, and preferably three, heat up cycles to bring the temperature of cooking compartment 16 up to the desired cook temperature. Although the temperature sensed by temperature sensor 22 might equal the desired cook temperature, the oven racks, porcelain interior and the food product temperature may still be less than the desire temperature. This can affect the stability of the cook temperature and degrade the cooking procedure.

Heat up procedure 70 begins at a step 73 where a heat up cycle count is reset to a reference value, say one. A next step 74 then conducts a heat up cycle by controlling heater 20 and/or fan 18 to heat cooking compartment 16 to about the desired cook temperature as sensed by temperature sensor 22. When the desired cook temperature is sensed, a next step 75 changes the cycle count by 1. A step 76 then determines if the cycle count is less than n, where n is an integer greater than one. Preferably, n is at least two, and more preferably is three. If the cycle count is less than n, step 74 repeats the run heat cycle step. Step 75 then changes the cycle count by one. Step 76 again determines if the cycle count is less than one, and so on until the cycle count equals n. When this happens, heat up procedure 70 is exited to step 55 of FIG. 3.

Figure 5:
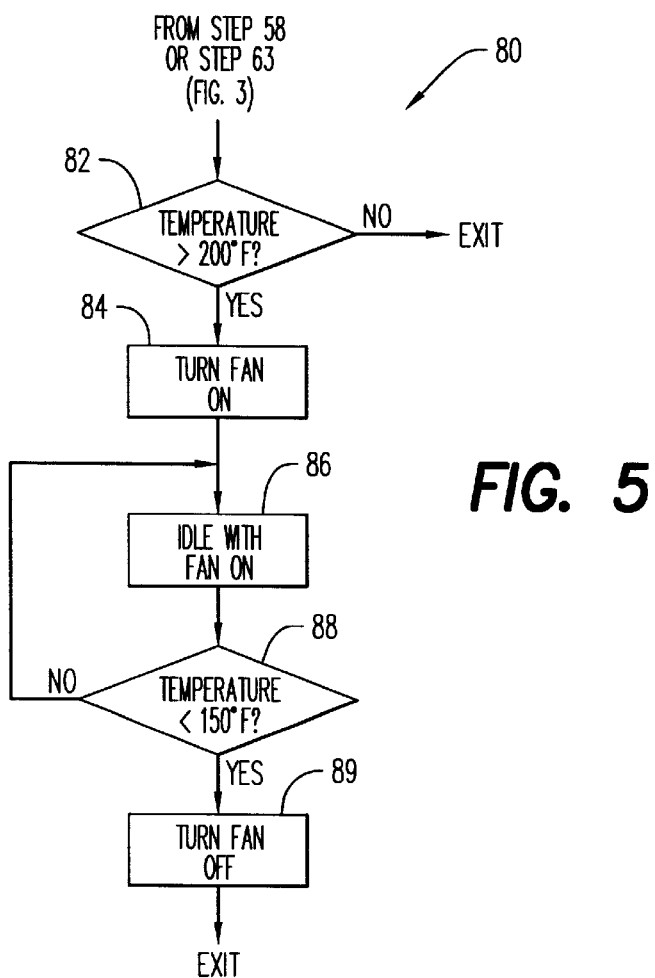
FIG. 5 is a process flow diagram for controlling an automatic cool down of the FIG. 1 oven.

Referring to FIG. 5, cooling procedure 80 begins at a step 82 which determines if the temperature of cooking compartment 16 is greater than a safe temperature, say 200° F., or other safe temperature selected by the designer or user of oven 10. If the temperature is not greater than 200° F., cooling procedure 80 is exited. If the temperature is greater than 200° F., a step 84 then turns fan 18 on. A step 86 causes the system to idle. A step 88 determines if the temperature is less than 150° F. If not, the system continues in a loop of steps 86 and 88 until the temperature is less than 150° F. When this happens, a step 89 turns fan 18 off and cooling procedure 80 is exited.

The present invention having been thus described with particular reference to the preferred forms thereof, it will be obvious that various changes and modifications may be made therein without departing from the spirit and scope of the present invention as defined in the appended claims.

What is claimed is:

1. A method of controlling an oven, said oven having a heater, a temperature sensor, a fan, a door, a cooking compartment and an oven on/off switch, said method comprising:
   (a) controlling said heater in a heat up procedure to heat said cooking compartment to a cook temperature;
   (b) controlling said heater to conduct a cook cycle;
   (c) controlling said heater and/or said fan to cool said cooking compartment to a standby temperature if a predetermined time has elapsed after said cook cycle ends without another cook cycle starting; and
   (d) controlling said heater to maintain said cooking compartment at said standby temperature.

2. The method of claim 1, and further comprising:
   (e) controlling said fan to cool said cooking compartment to a safe temperature when said oven switch has been turned off and the temperature of said cooking compartment is greater than said safe temperature.

3. The method of claim 2, wherein said step (e) is performed only when said door is open.

4. The method of claim 3, wherein said safe temperature is in the range of about 150 to 200° F.

5. The method of claim 4, wherein said step (e) is performed whenever said oven switch is switched from on to off.

6. The method of claim 2, wherein said heat up procedure includes:
   (a1) conducting two or more heat up cycles before step (b) is performed.

7. The method of claim 6, wherein each of said heat up cycles continues until said temperature sensor senses a cooking compartment temperature of about said cook temperature.

8. The method of claim 7, wherein at least three of said heat up cycles are conducted.

9. The method of claim 1, wherein said heat up procedure includes:
   (a1) conducting two or more heat up cycles before step (b) is performed.

10. The method of claim 9, wherein each of said heat up cycles continues until said temperature sensor senses a cooking compartment temperature of about said cook temperature.

11. A method of controlling an oven, said oven having a heater, a temperature sensor, a fan, a door, a cooking compartment and an oven on/off switch, said method comprising:
   (a) controlling said heater in a heat up procedure to heat said cooking compartment to a cook temperature by conducting two or more heat up cycles, each of said heat up cycles continuing until said temperature sensor senses an cooking compartment temperature of about said cook temperature; and
   (b) controlling said heater to conduct a cook cycle.

12. The method of claim 11, and further comprising:
   (c) controlling said heater and/or said fan to cool said cooking compartment to a standby temperature if a predetermined time has elapsed after said cook cycle ends without another cook cycle starting; and
   (d) controlling said heater to maintain said cooking compartment at said standby temperature.

13. The method of claim 12, wherein said step (e) is performed only when said door is open.

14. The method of claim 13, wherein said safe temperature is in the range of about 150 to 200° F.

15. The method of claim 14, wherein said step (e) is performed whenever said oven switch is switched from on to off.

16. A temperature controller for an oven that has a door, a heater, a temperature sensor, a fan, a cooking compartment and an oven on/off switch, said temperature sensor being disposed within said cooking compartment, said fan being located to circulate air in said cooking compartment, said temperature controller comprising:
   a computer controlling the temperature of said cooking compartment by:
      operating said heater for two or more heat up cycles with each of said heat up cycles continuing until said cooking compartment temperature is about equal to said cook temperature; and
      operating said heater and/or said fan to conduct a cook cycle.

17. The temperature controller of claim 16, wherein said computer further determines when the time elapsed after said cook cycle ends without another cook cycle starting equals a predetermined time and then operates said heater and/or said fan to cool the temperature of said cooking compartment to a standby temperature.

18. The temperature controller of claim 17, wherein said computer further operates said heater and/or said fan to maintain said cooking compartment at said standby temperature.

19. The temperature controller of claim 18, wherein said computer further operates said fan when said oven switch has been switched from on to off to cool the temperature of said cooking compartment to a safe temperature.

20. A memory medium for controlling a computer that controls the temperature of an oven having a temperature sensor, a fan, a door and an oven on/off switch, said memory medium comprising:
   means for controlling said computer to control said heater in a heat up procedure to heat said cooking compartment to a cook temperature;
   means for controlling said computer to control said heater to conduct a cook cycle;
   means for controlling said computer to control said heater and/or said fan to cool said cooking compartment to a standby temperature if a predetermined time has elapsed after said cook cycle ends without another cook cycle starting; and
   means for controlling said computer to control said heater to maintain said cooking compartment at said standby temperature.

21. The memory medium of claim 20, and further comprising:
   means for controlling said computer to control said fan to cool said cooking compartment to a safe temperature when said oven switch has been turned off and the temperature of said cooking compartment is greater than said safe temperature.

22. The memory medium of claim 21, wherein said cooking compartment is cooled to said safe temperature whenever said oven switch is switched from on to off if said door is open.

23. The memory medium of claim 22, wherein said heat up procedure includes conducting two or more heat up cycles before said cook cycle is performed, each of said heat up cycles continuing until said temperature sensor senses an cooking compartment temperature approximately equal to said cook temperature.

* * * * *